M. T. JACKSON.
Clamps for Carriage-Seat Backs.

No. 154,050. Patented Aug. 11, 1874.

Witnesses:
Henry N. Miller
N. H. Du Hamel

Inventor.
Moses. T. Jackson
Per
H. S. Abbot.
Attorney.

UNITED STATES PATENT OFFICE.

MOSES TURNER JACKSON, OF MONTROSE, PENNSYLVANIA.

IMPROVEMENT IN CLAMPS FOR CARRIAGE-SEAT BACKS.

Specification forming part of Letters Patent No. 154,050, dated August 11, 1874; application filed January 17, 1874.

*To all whom it may concern:*

Be it known that I, MOSES T. JACKSON, of Montrose, county of Susquehanna and State of Pennsylvania, have invented certain new and useful Improvements in Adjustable Gripe or Clamp, of which the following is a specification:

The nature of my invention consists in the construction and arrangement of an adjustable gripe or clamp, to be used for fastening the rail to a carriage-seat, the back to the rail, and in any place or for any purpose where it may be of use.

In order to enable others skilled in the art to which my invention appertains to make and use the same, I will now proceed to describe its construction and operation, referring to the annexed drawing, in which—

Figure 1:
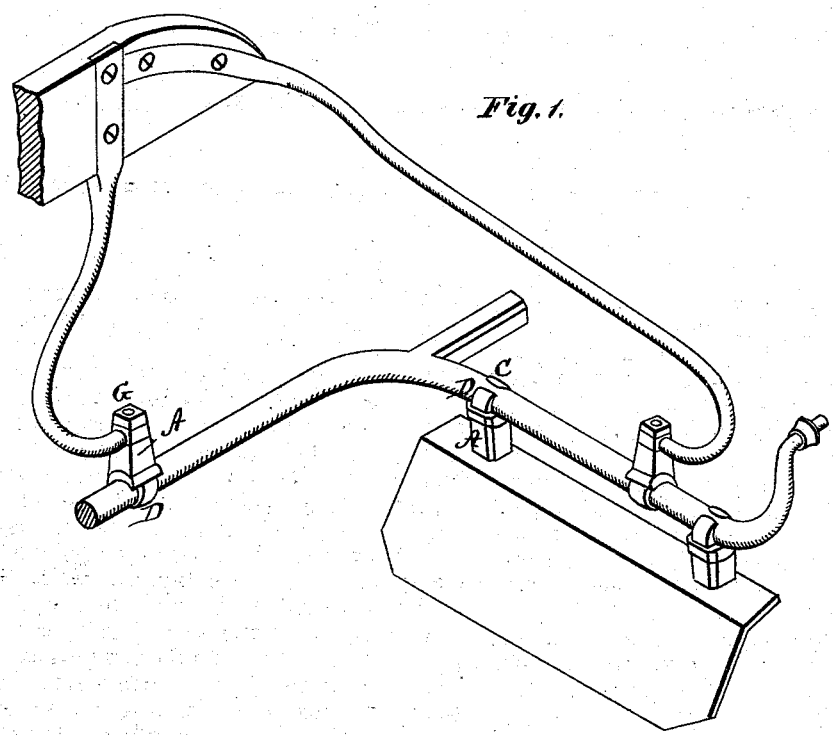
Figure 2:
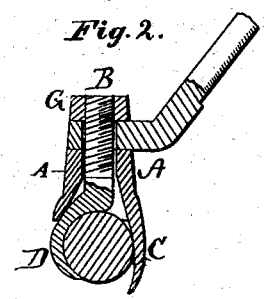

Figure 1 is a perspective view of the end of a seat and lazy-back, showing the application of my invention to the same; and Fig. 2 is an enlarged section of the adjustable gripe or clamp.

A represents a metallic collar or sleeve, made larger at one end than at the other, and the aperture at the smaller end being round and just large enough for the passage of a bolt, B. One side of the sleeve or collar A at the larger end is extended, forming a jaw, C. The bolt B, instead of being formed, as usual, with a head, is provided with a curved jaw, D, as shown in Fig. 2.

In applying this clamp, the jaw C of the collar is left straight, the bolt B passed from the larger end through the collar and the jaws C and D, one on each side of the rod or bar to be grasped. The end of the bolt projecting from the collar is passed through a hole in the article to which the rod or bar is to be clamped, after which a nut, G, is screwed down tight upon the end of the bolt. The jaw C is then bent around the rod with a hammer, forming a perfect lock, which will not detach itself, even if the nut G should be unscrewed.

Though I have especially designed this clamp for use upon carriages, to fasten the rail to the seat, and the back to the rail, I do not confine myself to these uses, as it may be employed in any place and for any purpose where it can be applied. It is convenient in use, easily attached and detached, and saves both expense and labor in manufacturing vehicles, as well as in repairing such parts as may become broken.

Having thus fully described my invention, what I claim as new, and desire to secure by Letters Patent, is—

The sleeve A, having jaw C, the bolt B, having jaw D, and the nut G, all constructed and combined substantially as and for the purposes set forth.

In testimony that I claim the foregoing as my invention, I hereunto affix my signature.

MOSES TURNER JACKSON.

Witnesses:
E. H. ROGERS,
G. F. FORDHAM.